United States Patent Office 2,831,878
Patented Apr. 22, 1958

2,831,878
ANTIBIOTIC RECOVERY

Stanley W. Ensminger, White Plains, N. Y., Peter P. Regna, Woodcliff, N. J., William E. Stieg, Mystic, Conn., and Albert E. Timreck, Rego Park, N. Y., assignors to Chas. Pfizer & Co., Inc., New York, N. Y., a corporation of Delaware No Drawing. Application November 28, 1956
Serial No. 624,719

3 Claims. (Cl. 260—429.9)

This invention is concerned with the recovery of certain antibiotic compounds, and in particular with their recovery from dilute, impure aqueous solutions. These compounds, which are highly active against a variety of microorganisms have been designated as tetracycline antibiotics. These include oxytetracycline (also known by the registered trademark Terramycin), chlortetracycline (known by the trademark Aureomycin), and tetracycline (trademarked Tetracyn). These compounds are closely related structurally and also have similar biological properties. The compounds may be designated by the formula:

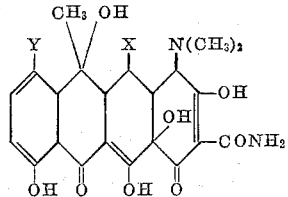

When X is hydroxyl and Y is hydrogen, the compound is oxytetracycline. When X is hydrogen and Y is chlorine, the compound is chlortetracycline. When X and Y are hydrogen the compound is tetracycline.

Tetracycline may be prepared by at least two different methods. In the first of these chlortetracycline is subjected to catalytic reduction to remove chlorine and produce the antibiotics. In the second process, tetracycline is formed directly by the growth of selected microorganisms under aerobic conditions in suitable nutrient media. Oxytetracycline and chlortetracycline are formed by fermentation. It is often necessary to recover the antibiotics from dilute, impure aqueous solutions, particularly when these are prepared by fermentation.

The valuable process of this invention involves precipitating the antibiotics oxytetracycline, chlortetracycline and tetracycline in the form of complexes with combinations of certain polyvalent metallic ions. Mixtures of two or more of the three antibiotic compounds may also be precipitated by the process.

The recovery of these antibiotics is accomplished most readily by precipitation of the active compound from dilute aqueous solutions by means of combinations of certain polyvalent metallic ions. These antibiotics form simple metallic salts of limited solubility with various bi- and tri-valent metallic ions. However, when more than one of the polyvalent metallic ions is present in an aqueous solution of one or more of the tetracycline antibiotics, there are formed metallic complexes containing two or more metals which are particularly low in aqueous solubility. Thus, a high proportion of the active compound may be recovered from solutions which contain a very small percent of the antibiotics.

Water soluble ionizable metal salts which are particularly effective in the formation of the metallic complexes according to the present invention are those containing metals of the class consisting of barium, strontium, calcium, magnesium, zinc, beryllium, cadmium, and mercury, at least two such metal salts being required. These elements all occur in group II of the periodic table. The precipitation is effected from aqueous solution most efficiently at a pH between about 7 and about 10.5. The metallic ions are preferably added to the solution in the form of water soluble salts. Generally the halides and especially the chlorides and bromides are quite useful. Also useful are the nitrates, formates, acetates, chlorates, and iodides of these metals since they have uniformly good water solubilities. Water soluble salts of the above metals containing the following anions are also operable: propionate, butyrate, citrate, salicylate, sulfocarbolate, benzoate, lactate, dithionate, ferricyanide, ferrocyanide, cyanide, nitrite, perchlorate, hydrosulfide, thiocyanate, thiosulfate, fluoride, hydroxide, bromate, iodate, sulfate, tartrate, carbonate, as well as various water soluble double salts e. g. magnesium ammonium chloride, zinc ammonium sulfate, and magnesium ammonium sulfate.

From the foregoing description of the suitable salts of the stated polyvalent metals, it will be apparent that they must not only be water soluble in order to introduce the appropriate metallic ions, but they must also be salts having anions which are compatible with the tetracycline antibiotic in solution. By compatible with as used herein, including the claims, is meant that they do not cause degradation of the antibiotic. Thus, although water soluble perchlorates are strongly oxidizing, they are suitable for the purpose of the present invention. On the other hand, strongly oxidizing metallic salts, such as the permanganates, may cause undesired degradation and, accordingly, are not considered compatible with the antibiotic. Similarly, strongly reducing water soluble metallic salts are found to cause degradation products and are, therefore, not classified as compatible with the tetracycline antibiotic.

In summary of the foregoing, the essence of the present invention is the discovery that the introduction of two or more metallic ions of the stated class precipitate an unexpectedly high yield of the antibiotic as a metal complex so long as the anions of the metallic salts introduced have no part in any undesired side reactions causing formation of antibiotic degradation products. Anions which are compatible with the antibiotics are set forth as a class above, and the examples appearing hereinafter support the use of metallic salts containing these anions.

Often it is preferred to add the salts at an acid pH and then raise the pH of the mixture to precipitate the antibiotic in the form of a solid complex. Although these complexes containing two or more metals vary somewhat in solubility with the particular metallic ions that are chosen, generally they are of a very low order of solubility in water, that is, less than about 100 micrograms per milliliter. By contrast corresponding complexes containing a single metal are at least about 3–4 fold more soluble. For example, the oxytetracycline double salt containing the molecular ratio 4:2:1 of antibiotic, magnesium, and barium has an aqueous solubility of 55–80 mcg./ml. in the pH range 7–10.5. On the other hand, oxytetracycline complexes of calcium, magnesium, barium, and strontium containing the single metals have solubilities in excess of 1 mg./ml. in this pH range.

In operating the present process a dilute aqueous solution of the antibiotic such as a fermentation broth is treated with the required water soluble polyvalent metallic compounds, for example, calcium chloride and barium chloride in a proportion which furnishes a combined weight of salt at least about equal to the weight of antibiotic in the solution. The solution is adjusted to a pH in the range indicated above, that is, from about 7 to about 10.5, either before or preferably after addition of the metallic compounds. The reaction mixture is preferably stirred or otherwise agitated during the addition of the metallic compounds and during the adjustment of the pH in order to assure completion of the reaction and to avoid overacidity or overalkalinity in any portion of the mixture. After stirring for a further short period the precipitate is removed from the solution. This may be accomplished by filtering or by centrifuging the mixture or by other conventional methods. It is often desirable to add a filter aid such as a diatomaceous earth product before filtration. The product so obtained may be dried, and is useful for certain purposes, for instance, if the polyvalent metallic ions used are relatively non-toxic (e. g. calcium chloride), the preparation may be used directly as an orally administered therapeutic agent. Alternatively, the product may be used for its stimulatory effect on plant or animal growth.

It should be noted that upon basifying fermentation broths of the tetracycline antibiotics, a certain amount of the antibiotic may be precipitated. This is due primarily to the presence in the fermentation media used of certain polyvalent metallic ions, particularly calcium and magnesium. The proportion of the antibiotic precipitated depends upon the relative amount of these polyvalent metals present in the fermentation media, and upon the nature of these metals. Certain of the crude materials used as components in the fermentation media contain certain proportions of such metals as calcium and magnesium. However, these polyvalent metallic ions are generally not present in sufficient proportion to guarantee precipitation of a major part of the antibiotic upon making the antibiotic solution alkaline. It is one object of this invention to furnish a process whereby a major part of the antibiotic is precipitated from such impure, dilute aqueous solutions by deliberate addition of sufficient amounts of two or more polyvalent metallic ions and adjustment of the pH.

The optimum proportions of metal salts to precipitate the antibiotic varies with the antibiotic under consideration; the combination of metals employed; and the nature of the aqueous solution from which the antibiotic is precipitated e. g., the pH, the presence of other solute, etc. For a given set of conditions, the least soluble metal salt of the antibiotic is precipitated. The optimum proportion of the added salts required can be readily calculated from the composition of the precipitate obtained in a small trial run and the antibiotic content of the solution under consideration. Thus portions of the aqueous antibiotic solution are treated with a measured volume of standard solutions of various polyvalent metallic compounds to determine a suitable precipitant combination for the particular antibiotic solution. The optimum precipitant combination has been found to be about 15–85 mole percent of one metal salt and the balance of the second metal salt when combinations of two salts are employed as is preferred. As noted above, certain divalent metals are particularly useful in the present process. These belong to group II of the periodic table. The metal complexes are useful as industrial bactericides, as plant growth stimulants and, when metals of low toxicity are used, as therapeutic agents and animal growth stimulants.

To regenerate a simple tetracycline antibiotic salt or an amphoteric tetracycline antibiotic from the solid product obtained according to the present invention, it is often convenient to dissolve this solid product in acid. If an acid is used which forms a water-insoluble compound with the particular polyvalent metals present in the solid tetracycline complex, the metallic ions are then separated as their insoluble salts from the acid solution of the antibiotic. Thus, when the barium-calcium complex of one of the tetracycline antibiotics is treated with dilute sulfuric acid, the antibiotic dissolves and a solid residue of calcium sulfate and barium sulfate remains. The solid may be removed, for instance, by filtration. It is often desirable to use a second acid treatment of the solid material to assure dissolution of all of the antibiotic. The combined aqueous acid solution of the antibiotic may then be adjusted to a pH of about 6–9 and preferably about 7, to precipitate the amphoteric antibiotic. Very high concentrations of the antibiotic are achieved by using care in keeping the volume of acid to a minimum. Small amounts of metallic salts may still be present in the precipitated antibiotic. The process may then be repeated to remove these. If the amphoteric antibiotic is precipitated at a pH of about 5, less of the metallic impurities will remain than is the case at higher pH's. The purified antibiotic thus obtained may be utilized for therapy of animals or humans or for such purposes as plant growth stimulation or animal growth stimulation. Alternatively, it may be more highly purified and obtained in crystalline form. This may be accomplished, for instance, by dissolving the purified product in methanol containing hydrochloric acid and then adding a further quantity of hydrochloric acid to bring about precipitation of the crystalline hydrochloride.

In operating the present process it has been found that the amount of metallic ions required to precipitate the antibiotic varies somewhat with the prior treatment of the fermentation broth. Generally acids are used for clarification of the broth during the filtration of the mycelium. It has been found that if sulfuric acid is used for this purpose appreciable amounts of metallic ions which form water-insoluble sulfates must be used to remove the excess sulfuric acid before the metals begin to precipitate the antibiotic. Hydrochloric acid has been found particularly useful for acidification of the fermentation broth prior to filtration of the mycelium. Since most of the metals mentioned above form relatively water-soluble hydrochlorides, no excess metallic ions are required.

One of the preferred combinations of metallic ions for precipitation of the tetracycline antibiotics is the use of a water soluble barium salt and a water soluble magnesium salt. The use of one proportion of the magnesium salt to two proportions of the barium salt is advantageous for precipitating oxytetracycline. The ratio of the metallic ions to the antibiotic in the precipitate is not fixed, but varies depending upon the proportion of the metallic ions used as well as with the metallic ion content of the original antibiotic solution, the pH at which the precipitation is accomplished, and other things. It should be noted that the complexes are prepared by precipitation with two specific metallic ions, for example, barium and magnesium, and, in addition to these metals, certain other polyvalent metals originally present in the fermentation broth. It has been found that the precipitate obtained by treating the pure aqueous solution of one of the antibiotics (oxytetracycline) with a mixture of soluble barium and magnesium salts in the minimum amount required to effect substantial precipitation of the antibiotic contains the following ratio of components: 4 oxytetracycline, 2 magnesium and 1 barium when the pH of precipitation was about 9.0. This only applies to pure solutions particularly under these exact conditions. When impure solutions are used or other concentrations, maximum precipitation of the antibiotic requires a different ratio of the metals and a different proportion and variation of other conditions.

It should be noted that the complex compounds of the tetracycline antibiotics of this invention are not converted to products containing only two polyvalent metallic ions, for instance, three or more polyvalent metallic ions may be involved in the formation of such precipitates. Furthermore, the complex metallic compounds of the tetracycline antibiotics may be varied in composition by bringing the solid precipitate into contact with a solution of polyvalent metallic ions other than those involved in the precipitation. Thus, a precipitate obtained from oxytetracycline with calcium and magnesium may be varied in composition by bringing the solid precipitate into contact with a solution of polyvalent metallic ions other than those involved in the precipitation. Thus, a precipitate obtained from oxytetracycline with calcium and magnesium may be changed to include a considerable amount of barium by treating the precipitate with a solution of a soluble barium salt. In the oxytetracycline series of complexes the barium-magnesium compound seems to be least soluble. The barium-zinc solution is of the same order of solubility, and the calcium-magnesium salt is somewhat more soluble. The addition of more than two water soluble salts of the desired polyvalent metallic ions may result in the precipitation of an appreciable proportion of the complex of the antibiotic with the two metals that form the least soluble complex; however, some of the other metals present will generally precipitate with the antibiotic although these will be present in a minor proportion.

In some cases, mixtures of two or more of the antibiotics are encountered, for example, the growth of certain microorganisms produces mixtures of chlortetracycline and tetracycline. Such mixtures may be precipitated by the method described herein. The antibiotics may not be precipitated in exactly the same proportion as they are present in the solution, since the relative solubilities of the complexes of the different antibiotics are not the same. The mixed precipitates may be converted to the mixed amphoteric antibiotics or mixed antibiotic salts. The mixtures may be used for the same purposes described above for the individual antibiotics or the mixtures may be separated.

As mentioned above, a tetracycline antibiotic or a tetracycline antibiotic acid solution may be regenerated from the precipitates obtained according to the present process by treatment with acids or by other means. It was also noted that small amounts of metals may be carried through this process and remain with the antibiotic. Since these cause discoloration of the product and other undesirable effects, their removal may be indicated. Treatment of acid solutions of the regenerated tetracycline antibiotic with a soluble ferrocyanide will assist in the removal of the small amount of polyvalent metals still remaining in the product. The precipitate may be filtered or removed in another manner, and the clear filtrate may be treated with a soluble alkali to precipitate amorphous tetracycline antibiotic of a high purity and light color. This assists in obtaining a high yield of crystalline antibiotic.

This application is a continuation-in-part of copending application Serial Number 412,634, filed February 25, 1954, and now abandoned, which in turn is a continuation-in-part of application Serial Number 165,588, filed June 1, 1950, and now abandoned.

The following examples are given by way of illustration only and are not to be considered as limitations on the scope of this invention, which is to be limited only by the specific wording of the appended claims.

Example I

An oxytetracycline fermentation broth was prepared as follows:

|  | Grams |
| --- | --- |
| Soybean meal | 500 |
| Cerelose | 500 |
| Distillers solubles (water-soluble extract from spent alcohol fermentation mash) | 25 |
| Sodium chloride | 250 |

Distilled water to make 50 liters.

The pH of the mixture was adjusted to 7.0 by addition of sodium hydroxide, and 50 grams of calcium carbonate was then added.

The above broth was sterilized at 121° C., cooled and inoculated with *Streptomyces rimosus* and cultured for four days at 28° C. with continual shaking. The cultured broth was brought to a pH of 2.5 by the addition of dilute sulfuric acid, then filtered to provide a quantity of clarified broth. In the clarified broth containing 44.9 million mcgs. of the antibiotic was dissolved, with stirring, 120 grams of barium chloride dihydrate and 48 grams of magnesium chloride hexahydrate. The resulting solution was then adjusted to pH 9.0 with sodium hydroxide solution. After ten minutes of standing, the precipitate that formed was filtered, using a small amount of a suitable filter aid (diatomaceous earth). The spent broth and wash was found to have a total oxytetracycline content of 1.92 million mcgs.

The precipitate was further worked up by first being suspended in 2 liters of water and adjusted to pH 1.2 with sulfuric acid. The solution which contained 36.8 million mcgs. of oxytetracycline was separated from the insoluble material by filtration. By adjusting the solution to a pH of 7.0 with sodium hydroxide, oxytetracycline was precipitated. The oxytetracycline was filtered and was found to contain about 34 million mcgs. of antibiotic. This material is of much higher purity than is the oxytetracycline contained in the fermentation broth, but it still contains small amounts of metals such as calcium and magnesium. The filtrate from this precipitated product contained 2.3 million mcgs. of oxytetracycline.

Barium ion is supplied as set forth in the above procedure by substituting each of the following salts for barium chloride dihydrate: barium acetate, barium chlorate, barium dithionate, barium formate, barium iodide, barium nitrite, barium perchlorate, barium hydrosulfide, barium thiocyanate, barium thiosulfate, and barium tertasulfide. Oxytetracycline is recovered as a metallic complex with barium and magnesium in substantially the same high yield as obtained when employing the chlorides of barium and magnesium.

Example II

Oxytetracycline broth prepared as above and containing about 20 million mcgs. of the antibiotic but clarified with hydrochloric acid at pH 2.5, was adjusted to pH 9.0 with sodium hydroxide. To this was added 50 g. of barium chloride dihydrate and 20 g. of magnesium chloride hexahydrate dissolved in 200 ml. of hot water. The mixture was stirred one-half hour, 80 g. of Super-cel (diatomaceous earth) was added and the solid was filtered. The filtrate contained 0.8 million mcgs. of antibiotic. The filter cake was washed with a liter of water and the wash was found to contain 0.5 million mcgs. of oxytetracycline.

The cake was triturated three times with 600 ml. water, each time adjusting the pH to 1.5 with sulfuric acid and filtering the solid. The combined filtrates contained 12,000 mcgs./ml. of antibiotic. To the combined filtrates was gradually added sodium hydroxide solution until the pH reached 7.0. Crude oxytetracycline precipitated and was filtered and washed with 200 ml. of water. The filtrate and wash contained about 2.3 million mcgs. of antibiotic. The cake was dried overnight under vacuum at 50° C. It weighed 25.0 g. and assayed 650 mcgs./mg.

Magnesium ion is supplied as set forth in the above procedure by substituting each of the following salts for magnesium chloride hexahydrate: magnesium acetate, magnesium perchlorate, magnesium ammonium sulfate, magnesium ammonium chloride, magnesium formate, magnesium iodide, magnesium bromate, magnesium thiosulfate, diabasic magnesium citrate, and magnesium sulfate. Oxytetracycline is recovered as a metallic complex with barium and magnesium in substantially the same high yield as obtained when employing the chlorides of barium and magnesium.

Example III

A broth similar to that of Example I but having an equal weight of an enxymatic digest of casein in place of the distillers solubles was similarly prepared and clarified with hydrochloric acid at pH of 2.5. The clarified broth was adjusted with sodium hydroxide to pH 9.0, and then extracted several times with 10% portions of normal butanol by volume. It was found that the antibiotic was extracted at least partially as salts with metals such as calcium and magnesium. It is also possible to extract complex metal compounds of oxytetracycline with other metallic combinations such as barium-magnesium and barium-zinc. The butanol extract was in turn extracted with half its value of 1 normal hydrochloric acid in water. This aqueous concentrate contained 4600 mcg./ml. of the antibiotic. Forty milliliters of this solution was adjusted to pH 9.5 with dilute sodium hydroxide, and the pricipitate that formed was centrifuged and separated from the clear supernatant liquor. This residual liquor was found to contain about 500 mcg./ml. of oxytetracycline indicating that about 90% of the antibiotic had been precipitated. The precipitate was washed with water and dried. It assayed about 675 mcg./mg. A sample was shown to contain about 35% ash (sulfated) which consisted of approximately equal amounts of calcium and magnesium. As noted above, the calcium and magnesium are extracted from oxytetracycline broth into the butanol as complex metal salts, in this case predominately the calcium-magnesium complex compound.

*Example IV*

A tetracycline fermentation broth was prepared by growth in a nutrient medium under submerged aerobic conditions of a Streptomyces which produces a major proportion of tetracycline. After completion of the fermentation, the broth was acidified to a pH of 2.5 with hydrochloric acid and filtered. One liter of the filtered broth was treated with 42.4 milliliters of a solution prepared by dissolving 342 grams of barium chloride dihydrate and 45.6 grams of magnesium chloride hexahydrate in 950 grams of water. The mixture was stirred and adjusted to pH 8.5 with dilute sodium hydroxide solution. Stirring was continued for approximately one-half hour and the precipitate was then removed by filtration using a small amount of a diatomaceous earth filter-aid. Assay of the filtrate indicated the removal of approximately 90 percent of the antibiotic activity. The moist filtercake was suspended in the minimum volume of water and adjusted to pH 1.5 with 50 percent sulfuric acid. The mixture was agitated for a short time and then filtered. The moist filtercake was again suspended in the minimum volume of water, adjusted to pH 1.5 with 50 percent sulfuric acid and refiltered. The two filtrates were combined and adjusted to pH 4.5. Amphoteric tetracycline separated from the solution in the form of a finely divided light colored solid. This solid was filtered with the assistance of a small volume of filteraid, and it was shown to be highly active biologically. Crystals were obtained by dissolving the amphoteric antibiotic in a strong solution of calcium chloride in methanol, filtering and adding concentrated hydrochloric acid. The crystalline tetracycline hydrochloride separated.

*Example V*

A solution of chlortetracycline was prepared by cultivating, under submerged aerobic conditions in a nutrient medium, a chlortetracycline-producing strain of *Streptomyces aureofaciens*. The mycelium was filtered from the acidified fermentation mixture and the antibiotic was recovered just as described in Example IV above. The product was identified as chlortetracycline by its characteristic physical properties.

*Example VI*

The procedure of Example I is duplicated employing the chlorides of the following metal pairs: barium-zinc, barium - cadmium, barium - beryllium, barium - mercury (mercuric chloride), barium-calcium, and calcium-strontium. The oxytetracycline antibiotic is recovered as a metal complex, in each instance, of the appropriate metal pair and in substantially the same high yield.

*Example VII*

The procedure of Example II is repeated employing the metal chloride pairs of Example VI with substantially the same results.

What is claimed is:

1. A process for the recovery of oxytetracycline from a dilute aqueous solution thereof which comprises introducing at least two water soluble metallic salts into the solution of oxytetracycline, the combined weight of the metallic salts being at least as great as the weight of oxytetracycline contained in solution and the pH of the solution being between about 7 and about 10.5, said metallic salts being salts of metals selected from the group consisting of beryllium, magnesium, calcium, strontium, barium, cadmium, zinc and mercury, and the anions of said salts being non-reactive with oxytetracycline, and separating precipitated oxytetracycline as a metallic complex of said at least two metals.

2. The process of claim 1 wherein the aqueous solution of oxytetracycline is a fermentation broth.

3. The process of claim 2 wherein the pH of said fermentation broth, including introduced metallic salts, is from about 8 to 9.

References Cited in the file of this patent

FOREIGN PATENTS 1,068,623     France  ---------------- Feb. 10, 1954